United States Patent [19]
Baumann et al.

[11] 3,731,536
[45] May 8, 1973

[54] APPARATUS FOR CONTINUALLY MEASURING THE TEMPERATURE OF A CONTINUOUSLY CAST METAL ROD

[75] Inventors: Hans G. Baumann, Duisburg; Heinz Dietrich Schneider, Rheinhausen, both of Germany

[73] Assignee: DEMAG Aktiengesellschaft, Duisburg, Germany

[22] Filed: Nov. 13, 1969

[21] Appl. No.: 876,379

[30] Foreign Application Priority Data

Dec. 7, 1968  Germany.....................P 18 13 330.7

[52] U.S. Cl. ..................73/351, 73/359, 136/221, 164/154
[51] Int. Cl. .......B22d 1/02, G01k 7/02, G01k 13/06
[58] Field of Search ....................73/351, 359; 164/4, 164/154; 136/221

[56] References Cited

UNITED STATES PATENTS

| 3,534,610 | 10/1970 | Pruden....................................73/359 |
| 2,206,930 | 7/1940 | Webster...........................164/278 X |
| 2,466,137 | 4/1949 | Vollrath..............................73/359 X |
| 2,752,411 | 6/1956 | Walter.................................73/359 X |
| 2,818,732 | 1/1958 | Bennett..............................73/351 X |
| 3,246,519 | 4/1966 | Dornberger........................73/359 X |
| 3,333,476 | 8/1967 | Hardy et al............................73/362 |
| 3,358,743 | 12/1967 | Adams............................164/154 |
| 3,364,979 | 1/1968 | Carton............................164/154 |

Primary Examiner—Louis R. Prince
Assistant Examiner—Frederick Shoon
Attorney—McGlew and Toren

[57] ABSTRACT

A method and apparatus for continuously measuring the temperature of a metal rod which is continuously cast and as the rod is fed away from its associated casting mold includes a rotating cylinder or wheel having a plurality of temperature sensors arranged at spaced locations around the circumference which engage against the rod at one or more particular locations. The temperature which is sensed is advantageously transmitted either by wire or radio wave to a control station where the information is employed for the regulation of the feeding and molding and subsequent forming of the continuously cast rod. The device advantageously includes an electrical temperature feeler having one feeler element which is adapted to be connected to a segmental contact and another feeler element adapted to be connected to another segmental contact within the cylinder which moves with its circumference in engagement with a side of the cast rod which is formed. A electrical circuit is provided with means for determining the maximum temperature of each of the feeler elements or a specific temperature as desired and for amplifying the indicated value in transmitting it to a control station as desired. The cylinder may be arranged to roll against the rod, for example, at the location of the so-called sump tip at which the entire rod cross sections begins to solidify.

9 Claims, 4 Drawing Figures

INVENTORS
Hans G. BAUMANN
Heinz Dietrich SCHNEIDER
BY
McGlew & Toren
their ATTORNEYS

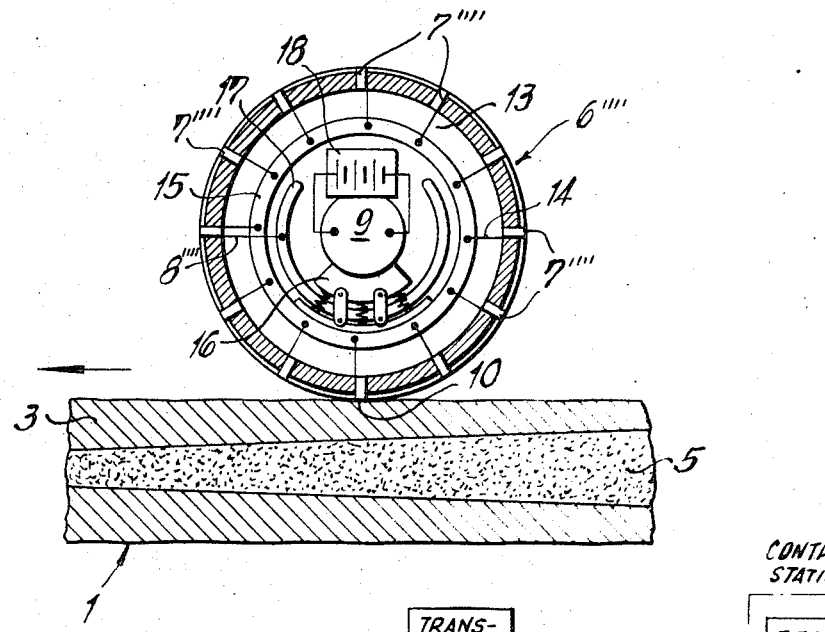
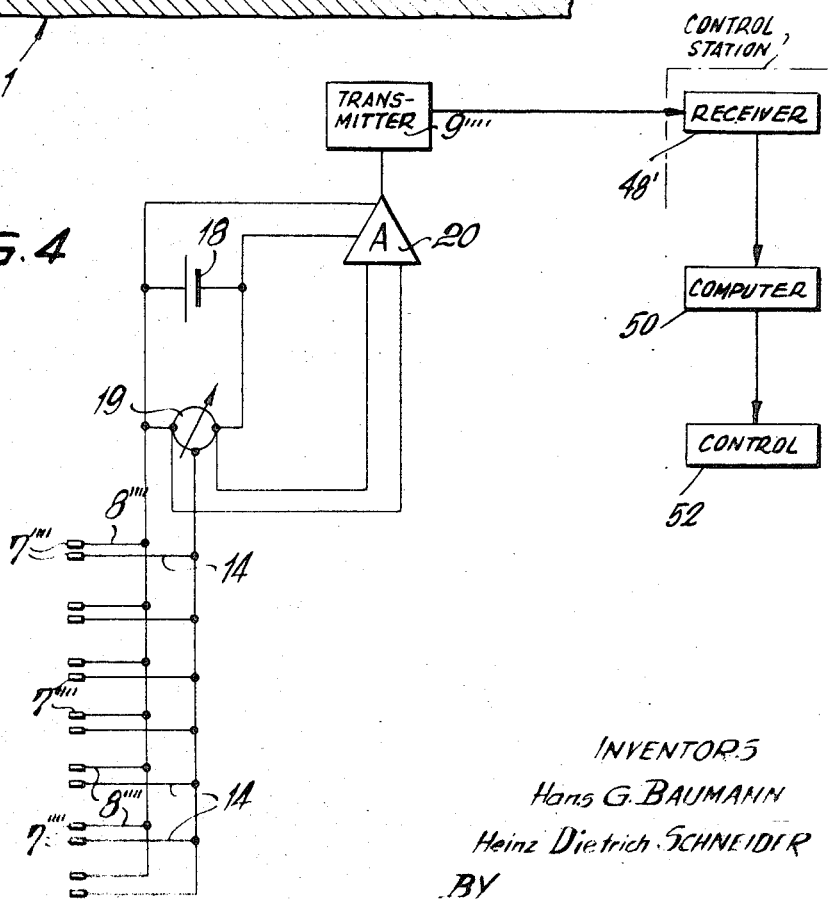

APPARATUS FOR CONTINUALLY MEASURING THE TEMPERATURE OF A CONTINUOUSLY CAST METAL ROD

SUMMARY OF THE INVENTION

This invention relates in general to a method and apparatus for treating and controlling the formation of continuously cast metal rods and in particular, to a new and useful method and device for continuously measuring the temperature of a metal rod as it is being cast and for transmitting the measurement information, for example, to a control station for regulating the treatment of such rods particularly the treatment of cast steel rods.

Surface temperatures above 700°C can be measured without major expenditure and up to a temperature range of about 2,000°C by radiation pyrometry. The moving measuring object presents only difficulties insofar as its surface is covered with scale. The temperatures of metal rods in rolling mills which are measured by radiation pyrometry are thus not always produced without distortion. In the entire technology a device for certain purposes has certain qualities. Requirements going beyond these are no longer within the range of application of such a device. In the measurement of surface temperatures of sheet metal the differences with respect to the interior of the metal and the exterior are not so great, so that it is not possible to conclude from the outside temperature the conditions of the inside temperature. As far as the mean temperature is thus in a range favorable for radiation pyrometric measurements, the use of such measuring methods can be recommended.

If each measuring object which is covered with a surface scale is already subject to a natural urge to change constantly, the surface temperatures and smaller regions and the conditions inside the large cross sectional surfaces of the core are even more difficult to observe. This situation appears in rolling mills or/and on blooming mill trains where holes are driven into the cold iron slabs into which are introduced specially designed thermocouples. The thermocouples provide information for operating pusher type furnaces with a different heating of the top and the underside which is important for the rolling mill process. With such a situation and with other rod formations the so-called temperature profile is important, that is, the temperature rise from the inside to the outside of the rod. The most pronounced example of such temperature difference from the inside to the outside is a cast rod which is produced in a continuous metal casting plant, and, of this type, particularly cast steel rods of any chemical composition and alloy steels or refined steels.

The temperature in the rod forms the starting point for the detachment in the continuous casting mold, for the bending and guiding and thus the feeding of the rod and also for subsequent straightening in the case of arcuate or deflection straightening machines. The temperature profile is even more important in rod forming. Because of the greatly varying temperatures, the state of the rod varies in the temperature ranges from solid, a mixing zone of solid-liquid, and liquid. Deformations can only be carried out safely when the entire cross section is in the hot forming range like the material in a hot rolling mill, for example.

Although a completely balanced temperature profile can hardly be achieved, the knowledge of the actual temperature course is a pre-requisite for further treatment and for the operation of the casting device. For continuous casting operations attempts have been made to determine the length of the sump of the liquid rod core by calculation and by pyrometric measurement. The heat potential stored in the interior of the rod suffers a considerable drop by the outer partly solidified part but it can be assumed that if the inner high potential were missing the rod shell could not heated to the same extent. The size of the inner heat potential determines therefore the temperature of the rod shell over the "transmission ratio". There is another factor which depends on the chemical composition of the casting material where the differences in the thermal conductivity of the solidified part can be seen. Since the thermal conductivity of the material varies, in addition, with its temperature range this variation must be taken into consideration unless of course a stationary state is established after some time and the temperature measurement is effected at the same point of the rod.

The pyrometric measuring method is based substantially on the radiation emitted by the preheated body. It thus measures the surface temperature. The temperature of the layer underneath the scale layer can differ considerably from the surface temperature value. This scale layer can also be irregular in its thickness. In addition under the scale layer there can be cavities or voids. The oxide films can have different radiating powers depending on the forming conditions. At the boundary of layer of the oxide metal the conditions of the heat passage are particularly difficult to measure and appraise. Calibrations can only eliminate those errors to a limited extent.

Other pyrotechnical measurements have sources of error because a desired conduction and guidance of the heat carrier cannot take place without contact. Upon contact however, the heat conduction is such in most cases that the measuring result is decisively falsefied.

The present invention is based on the problem of effecting the continuous measurement of temperature on metal rods particularly cast steel rods during the casting thereof. The particular difficulty is that the measurement must be effected on the moving rod and also that the problem of the scale layer must be solved. A further difficulty that could not be overcome up to the present time is the necessity to transmit the measured values to a remote location for the control of the casting and forming.

In accordance with the present invention, it is suggested that the above difficulties can be eliminated by bringing a cylinder into rolling contacting engagement with the rod which is being formed at least at one point along the length of the rod path of movement and at least on one cross sectional side of the rod. The amount of heat flowing into the cylinder or the resulting temperature is measured and the measured values are transmitted continuously by either wire conductors or by wireless transmitters such as radios to a receiving station which is set up for influencing the regulation of the casting operation. The control advantageously includes means for regulating and controlling the casting and or the feeding through the feeding machine and/or the regulation of the adjustment of the rolls for the rod forming.

A temperature sensing cylinder can be brought into contact with the continuously cast rod in many ways. It is possible to compress the cylinder against the scale layer in order to measure the temperature in direct contact with the rod. After a certain starting time, the exact temperature is obtained and no further delay of the measurement is necessary because the measured values can be transmitted by a radio transmission without delay to the control station receiving them. In contrast to the known state of technology it is thus possible to use control quantities with less errors in order to control the entire plant operation. The advantage regarding the casting, cooling and feeding and straightening or forming of the rod are considerable.

In accordance with the a preferred method of the invention, the measurements are taken at a plurality of measuring points and the measured values are fed to a computer in which comparison is made with fixed data of the casting material and of the plant. After a comparison of this data is made, influences are exerted on the operations with the end results that the casting, feeding, cooling or forming operations are improved. The evaluation of the results from such data processing devices permits treatment of the complex individual influential factors better than is done at the present time.

It is also of advantage that the measured values of several measuring points are transmitted to a single receiving station. The respective most accurate measuring quantity can be determined more easily and can serve as a selective value to regulate the main data decisively, such as for the regulation of the casting velocity for example.

A device for carrying out the method of the invention provides temperature feelers on a cylinder which has means for connecting the sensors through a conducting zone to a transmitter which revolves with the cylinder or to an electrical transmission device through an electrical cable. The transmitters form, together with the receivers arranged in the control center of the plant, a transmission zone for controlling the plant operation. In its simplest form the device provides a measuring and transmitting station and a receiving station with the associated regulating elements for the plant operation. The measuring and transmitting device comprises a cylinder with temperature feeler elements which are exposed at the surface thereof and which bear against the rod in alternate successions as the cylinder is rotated in contact with the rod which is being cast. The device provides information about the behavior of the temperatures in the cast rod which is important for the course of the entire casting process. The individual cylinders may be arranged adjacent the continuous casting mold, before the feeding machine and before the rod forming unit. The current supply for the transmitter arranged within the cylinder is effected by batteries which are also located within the cylinder and can comprise for example rechargeable battery cells. In another embodiment of the invention the signals are transmitted by a wireless current supply system to all of the accumulators or contact elements which are arranged in the measuring cylinders for feeding the transmitters.

In order to avoid loss of heat due to the contact of the measuring cylinder with the rod the measuring cylinders are advantageously made of a material of varying thermal conductivity and the temperature feelers are embedded in materials of high thermal conductivity. The amount of heat to be measured for the resulting temperature is measured therefore in the full heat current.

By using a rotating measuring feeler carrier element the measuring feeler always moves away from the rod and touches the rod relatively briefly. By arranging several temperature sensors around the periphery of the rotating cylinder several temperature indications can be obtained during each rotation of the cylinder. The individual feelers can be connected in dependence upon the position within the cylinder to an arcuate contact element which is in turn connected to a transmitter whenever a temperature feeler is in the immediate proximity to the point of contact. Such a measuring arrangement has a great advantage in that the measuring feelers themselves are subjected to great stress that they can sense the temperature if they are only in contact with the measuring object for a short period of time and permitted to cool off to an extent that there is no danger of destruction. In addition, there is no impairment of this sensing of the temperature because an additional measuring point which follows takes over the previously measured value. In this sense there is a division of the thermal load between the several temperature feelers and a division of the measuring work over the existing number of temperature feelers. The apparatus also includes means for switching the connection of the plurality of temperature sensors to the indicating device and to the transmitting means. For example, adjacent temperature feelers arranged around the circumference of the measuring cylinder are connected with each other by a differential or compensation circuit so that the first measured value can already be picked up by the following temperature feeler. The introduction of the amount of heat that determines the temperature is also facilitated by the fact that the measuring cylinder is provided with projections like studs or fins for effecting the sensing of the temperature.

Accordingly, it is an object of the invention to provide an improved method of carrying out a continuous casting process which includes arranging a moving member in contact with the casting to continuously sense the temperature of the exterior of the casting on at least one point along its path of movement, and transmitting the sensed values to a control station for use in controlling the conditions of continuous casting.

A further object of the invention is to provide a device for sensing the temperature of a continuously cast rod particularly a continuously cast steel rod which comprises a rotatably cylinder having a plurality of temperature feelers arranged around the circumference thereof which are adapted to sequentially bear against the rod at a particular point along its path of movement after casting, and wherein the cylinder contains means for transmitting the values of temperature which are sensed by the individual feeler elements to a control station.

A further object of the invention is to provide a device for sensing the temperature of a rod which is being continuously cast or one which has variations of temperature and constituency throughout its cross section comprising a rotatable cylinder having a plurality of individual feeler elements projecting outwardly from the circumference thereof at circumferentially spaced radial locations, arcuate contact means within said cylinder arranged to connect the feeler elements the point of physical contact of the cylinder and the temperature feeler with the casting rod to indicating and/or amplifying means and further to transmitting means for transmitting the temperatures to a remote location.

A further object of the invention is to provide a device for sensing temperature of a continuously cast rod at some location in respect to the continuous cast mold which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 is an enlarged partial cross sectional view of another embodiment of the invention; and FIG. 4 is an electrical diagram for the electrical connection of the device indicated in FIG. 3.

GENERAL DESCRIPTION OF THE PREFERRED EMBODIMENTS

Figure 1:
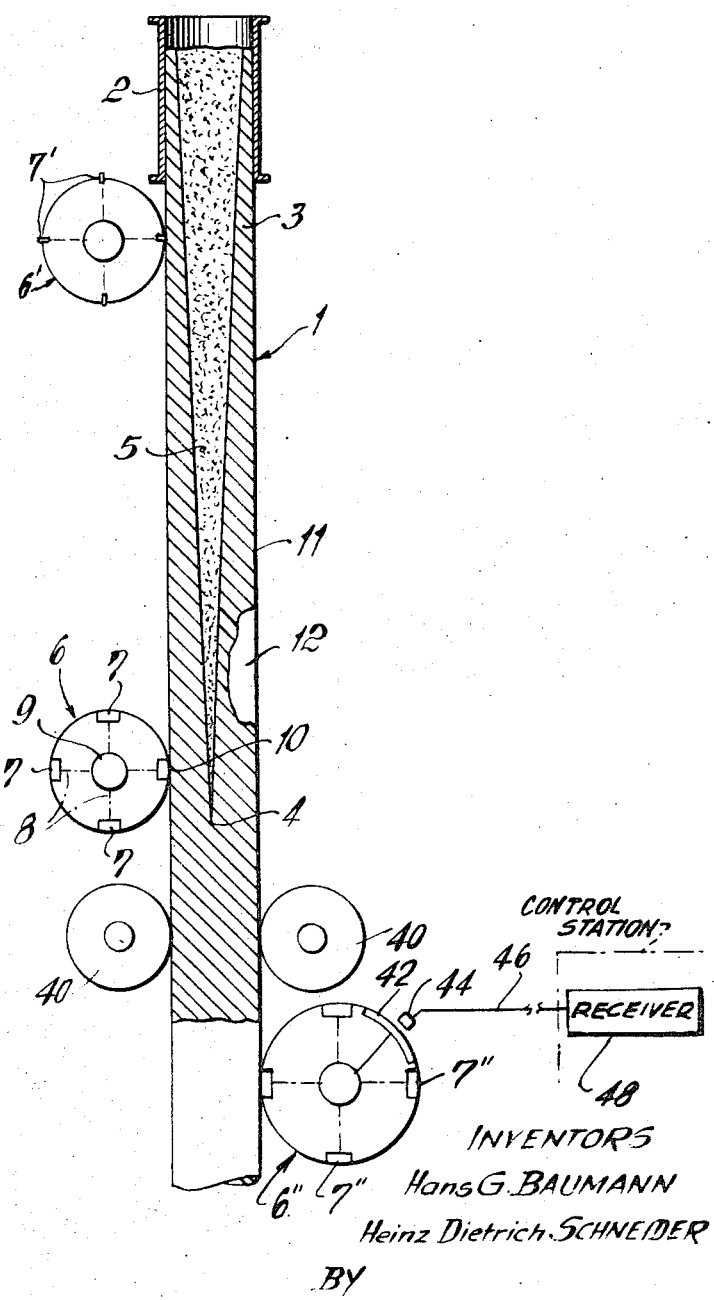
FIG. 1 is a vertical cross sectional view of a rod which is being continuously cast and having a measuring device associated therewith constructed in accordance with the invention.

Referring to the drawings in particular, the invention embodied therein in FIG. 1 comprises a continuous casting mold 2 for the continuous casting of a rod 1 which begins solidifying within the mold 3 to an extent such that it begins forming a rod shell 3. The rod shell 3 increases, in the conventional cooling method for continuous casting operations, substantially uniformly up to a so-called sump tip 4 at which point the rod is assumed to be completely solidified. The inner liquid part or core 5 of the rod 1 up to the sump tip 4 has thus a higher temperature than the rest of the rod so that the heat must be fed in large amounts from the core 5 through the rod shell 3.

Starting from a certain point of the rod, for example, in the range of the sump tip 4, the heat current decreases to such an extent that it can be considered reduced with respect to the preceding points. After the sump tip 4, the rod is in the hot forming range in which deformations can be safely effected.

In accordance with the invention means are provided for continuously sensing temperature of the rod 1 at some point along its formation after it passes through the mold 2. In the embodiment illustrated in FIG. 1, a measuring cylinder 6 having several temperature sensors 7 which project outwardly from its periphery at circumferentially spaced radial locations is mounted to rotate with its surface in direct contact with the rod 1 at a location near feed rollers 40, 40. The temperature sensor 7 engages into the surface of the rod 1 for the temperature sensing operation and they are connected through lines 8 to a transmitter 9 which transmits the measured values continuously or intermittently to a receiver (not shown). The transmitter 9 arranged within the cylinder 6 rotates with the cylinder and in this embodiment it needs no means connecting it to a receiving devices but instead it operates on a wireless or radial principle.

In the embodiment indicated in FIG. 1, the measuring cylinder 6 is in contact with the rod only at the point 10 and in the range of the sump tip 4. Several such measuring cylinders 6' and 6'', for example, can be provided at different cross sectional sides such as the front side 11 or the left side 12 as shown in FIG. 1 and also at diverse locations such as adjacent the mold 2 and beyond the rod feeding means 40, 40 at a location roller 6'' where the rod is to be formed by forming rollers (not shown). The temperature information sensed may be transmitted through a direct electrical connection such as slip ring 42 and pick up 44 and cable 46 to a control station 48.

Figure 2:
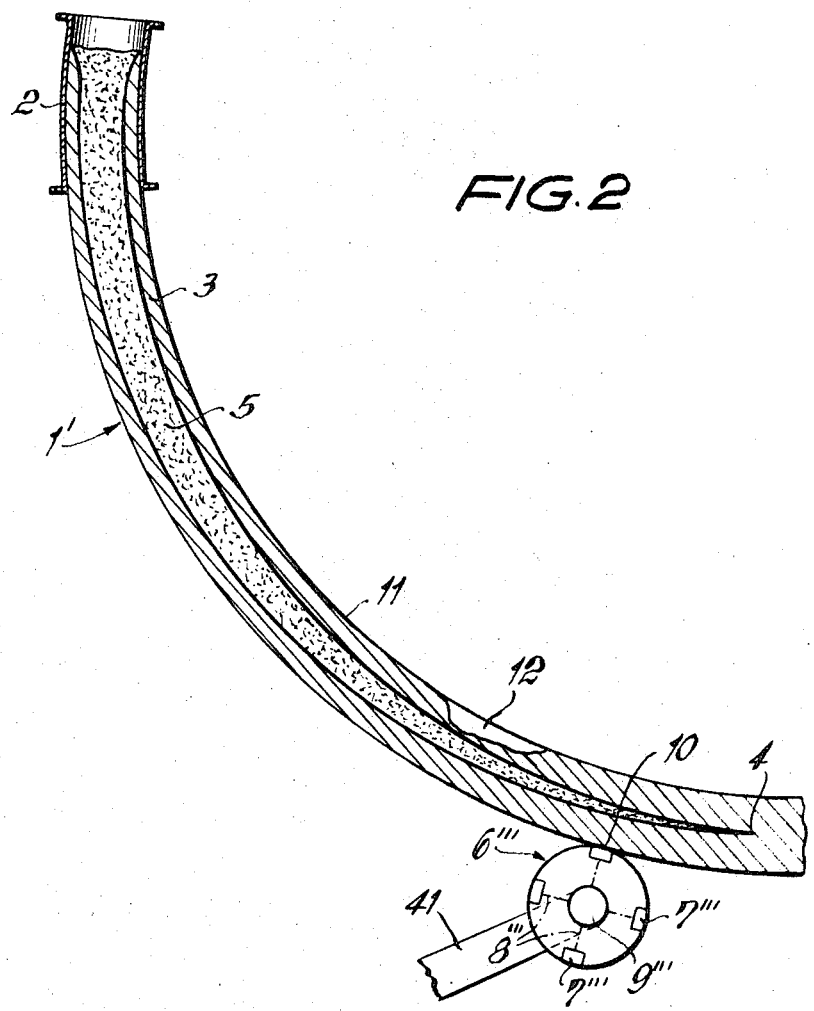
FIG. 2 is a view similar to FIG. 1 but showing a bent cast rod.

FIG. 2 shows the same arrangement of a temperature sensing cylinder 6''' in respect to a rod 1' which is bent during the continuous casting process and directed around through a curve as indicated. The measuring cylinder 6''' which is rotatably mounted on a movable rod 41 can therefore be applied in the range of the sump tip 4 whether in a vertical feed arrangement or in an arcuate feed arrangement for the rod which is formed. Such a temperature sensing arrangement is particularly suited for setting the conditions for the subsequent deformation of the rod either directly in the range of the sump tip 4 or thereafter. The invention is particularly suitable therefore in combination with rod forming stands of any type (not shown). The values which are transmitted by the transmitter 9 to the receiver 48 at the control station (FIG. 1) thus serve for example, to control the adjusting movement of the forming rolls of a forming stand or of a high forming unit such as a stretch forming machine. In addition, of course the values can be used for controlling the feeding of the material to the mold 2 and the rate of advance of the rod as it is formed.

In the embodiment illustrated in FIG. 3, there is provided a temperature sensing cylinder assembly generally designated 6'''' which includes a plurality of temperature sensors 7'''' comprising thermocouples arranged inside the cylinder 13 having one connection 14 applied to a common contact ring 15 so that the maximum temperature value which is measured at the contact point 10 can always be taken from this ring 15.

The same measuring cylinder 6'''' can also be designed with a transmitter 9'''' connected to receive the measuring values of the temperature sensors 7'''' only when the contact ring 15 with the respective temperature feeler 7'''' is just opposite the contact device 16 which extends through an arcuate range on either side of the contact point 10. The temperature sensor 7'''' also includes another contact 8'''' which extends back to the contact ring 17 which is connected to a power source 18 and to the transmitter 9'''''.

As indicated in the electrical diagram shown in FIG. 4, both the feed lines 8''' and the feed lines 14 from the temperature 7'''' are conducted to a compensation resistance or variable resistance 19 over which flows the current of the power source 18. The power source 18 also feeds to an amplifier 20 which sends its outerput signals to the transmitter 9''''. The transmitter 9'''' in turn transmits the temperature information to a receiver 48' at a control station. The information is put into a computer 50 for comparison with a control sample and control signals are sent out from the computer to an operational control 52 for changing the operation conditions are necessary. The compensation resistance 19 is so connected that when it is set correctly no current has to flow in the temperature feeler circuit. The temperature indicated by the temperature feeler 7'''' can thus be read immediately on the resistance 19 without a corresponding calibration of the apparatus.

Normally, when the sensing cylinder 6 rolls off the hot cast rod 1 there is a possibility that the temperature fluctuations along the circumference of the rod adversely influence the measuring result. The compensating circuit shown in FIG. 4 is provided to eliminate this by use of the compensating resistance which is set to permit reading of an average temperature value as it appears between two circumferential points of the measuring cylinder. The resistance 19 may be set so that there is no current flow in the circuit between the energy source 18 and the temperature sensor 7''''.

What is claimed is:

1. A device for continuously sensing the temperature of a metal rod as the rod is being continuously cast, comprising a rotatable cylinder having at least one temperature sensing element on its periphery which penetrates the rod being continuously cast, said cylinder with its temperature sensing element being rotatable upon movement of the rod to periodically position the temperature sensing element at a location to sense the temperature of said rod, and transmission means carried by said cylinder and connected to said temperature sensing element for transmitting sensed temperature information to a remote location.

2. A device, according to claim 1, wherein said transmission means comprises an electrical transmitting device having a cable extending to a remote station.

3. A device, according to claim 1, wherein said transmission means comprises a radio transmitter.

4. A device, according to claim 1, including a power supply in said cylinder electrically connected to said temperature sensing element, an electric transmitter connected to said power supply and to said sensing element and comprising said transmission means.

5. A device, according to claim 1, wherein said measuring cylinder is made of materials of high and low thermal conductivity said temperature sensing element being imbedded in a material of high thermal conductivity adjacent the periphery of said cylinder.

6. A device, according to claim 1, including a plurality of temperature sensing elements arranged around the periphery of said cylinder and a contact means within said cylinder electrically connected to said transmission means and to said temperature sensing elements and being effective to connect only those sensing elements adjacent the point of contact of said cylinder with said rod to said transmission means.

7. A device, according to claim 1, wherein said measuring cylinder temperature sensing element includes a plurality of projecting elements for penetrating into the cast rod.

8. A device according to claim 1, wherein said rod is continuously cast in a continuous casting mold and including a plurality of cylinders arranged along the length of said rod each having a temperature sensing element, and rod feeding means for feeding said continuous cast rod away from said mold, and wherein at least one of said cylinders is adjacent said continuous casting mold and one is adjacent said rod feeding means.

9. A device for continuously sensing the temperature of a continuously moving metallic body, comprising a rotatable cylinder having on its periphery a plurality of temperature sensing elements which penetrate said body, said cylinder with its temperature sensing elements being rotatable upon movement of the body to periodically position the temperature sensing elements at locations to sense the temperature of said body, and transmission means carried by said cylinder and connected to said temperature sensing elements for transmitting sensed temperature information to a remote location.

* * * * *